United States Patent
Yokota

(10) Patent No.: US 6,220,623 B1
(45) Date of Patent: Apr. 24, 2001

(54) SIDE AIRBAG DEVICE FOR RESTRAINING OCCUPANT'S HEAD

(75) Inventor: Keishi Yokota, Shiga (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/327,552

(22) Filed: Jun. 8, 1999

(30) Foreign Application Priority Data

Jun. 17, 1998 (JP) .................................................. 10-185738

(51) Int. Cl.[7] .......................... B60R 21/20; B60R 21/22
(52) U.S. Cl. ...................................... 280/728.2; 280/730.2
(58) Field of Search .............................. 280/730.2, 730.1, 280/728.2, 728.3

(56) References Cited

U.S. PATENT DOCUMENTS

| | | | |
|---|---|---|---|
| 5,480,181 | * | 1/1996 | Bark et al. .......................... 280/730.2 |
| 5,669,627 | * | 9/1997 | Marjanski et al. .................. 280/730.2 |
| 5,791,683 | * | 8/1998 | Shibata et al. ..................... 280/730.2 |
| 5,884,937 | * | 3/1999 | Yamada .............................. 280/730.2 |
| 5,904,367 | * | 5/1999 | Warnez et al. ..................... 280/728.3 |
| 5,921,575 | * | 7/1999 | Kretschmer et al. ............. 280/730.2 |
| 5,957,487 | * | 9/1999 | Stutz .................................. 280/730.2 |

FOREIGN PATENT DOCUMENTS

| | | |
|---|---|---|
| 296 05 897 | 7/1996 | (DE) . |
| 196 47 679 | 6/1997 | (DE) . |
| 197 12 039 | 11/1997 | (DE) . |
| 197 26 782 | 1/1998 | (DE) . |
| 197 52 989 | 6/1998 | (DE) . |
| 2 278 812 | 12/1994 | (GB) . |

\* cited by examiner

Primary Examiner—Peter C. English
(74) Attorney, Agent, or Firm—Kanesaka & Takeuchi

(57) ABSTRACT

A side airbag device is formed of a casing and an airbag within the casing. The casing is made of an extruded resin and is provided with a plurality of mounting portions at intervals of 500 mm or less by heat pressing. Portions of the airbag are clamped by the mounting portions. The side airbag device can be installed easily to a vehicle body and manufactured at a low cost.

4 Claims, 3 Drawing Sheets

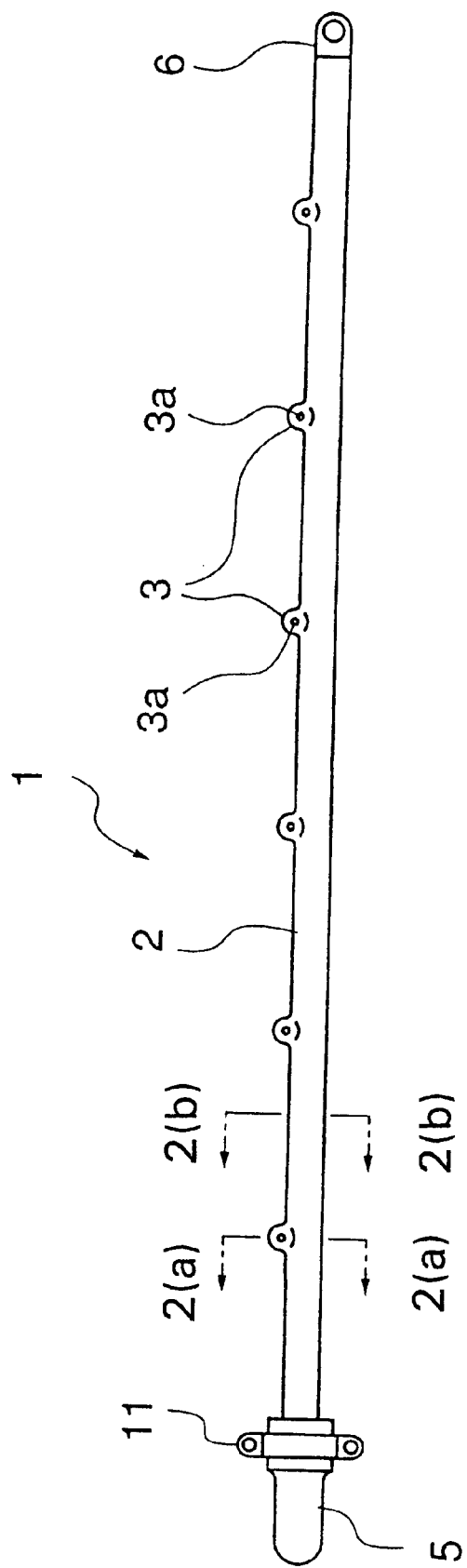

SIDE AIRBAG DEVICE FOR RESTRAINING OCCUPANT'S HEAD

BACKGROUND OF THE INVENTION AND RELATED ART STATEMENT

The present invention relates to a side airbag device for restraining an occupant's head having an airbag which is deployed at an upper side portion in a vehicle cabin to protect the head of the occupant in the event of a vehicle collision, and more particularly, to a side airbag device for restraining an occupant's head having a cover with improved strength and capable of providing easy installation.

In the airbag devices installed in vehicles, there is an airbag device such that a pressure or impact applied at a vehicle side is detected so as to inflate an airbag thereof at an upper side of a vehicle cabin. The head of an occupant is restrained or supported by this airbag to absorb kinetic energy for protecting the head of the occupant. Such an airbag device is called "a side airbag device for restraining an occupant's head" or "side impact airbag device (hereinafter, sometimes referred to as only the "side airbag device"). Most of the side airbag devices of this kind are installed along a roof side from a front pillar to a center pillar.

A side airbag device of this kind comprises a casing for accommodating an airbag therein. The casing is made of a thin member, which can be easily formed, such as soft iron, aluminum, or synthetic resin, and has a mounting portion to be fixed to a vehicle body. Inside the casing, an airbag body (abbreviated to as "airbag") is accommodated in the folded state. The airbag is formed in a long envelop-like configuration such that its width direction is parallel to the vertical direction of the vehicle body and the longitudinal direction extends from a front pillar to a center pillar of the vehicle body.

The airbag is folded and accommodated in the casing in a normal state. In the event of a collision at the vehicle side, gas is supplied into the airbag from an inflator communicating with the airbag, so that the airbag is inflated to project outside the casing. During this process, the airbag pushes the casing from the inside to tear or deform the casing to open it. The airbag projecting from the casing is deployed into a predetermined configuration between the vehicle body and the head of the occupant. Therefore, the kinetic energy of the head of the occupant caused by the side collision can be absorbed by the airbag.

However, since the conventional side airbag device as mentioned above is installed along the roof side, the space for installing the side airbag device is narrow and the side airbag device should have a complex configuration. There is therefore a disadvantage in taking a lot of time to install the side airbag device to the vehicle body.

The present invention obviates the above-described problem and the object of this invention is to provide a side airbag device for restraining an occupant's head which accomplishes the easy installation to a vehicle body and which can be manufactured at a low cost.

SUMMARY OF THE INVENTION

To solve the aforementioned problem, a side airbag device for restraining an occupant's head according to the present invention, which is installed to an upper side portion of a vehicle cabin, comprises a casing extending in the longitudinal direction and an airbag having a band-like configuration in the folded state which is accommodated in the casing. The casing is made of an extruded resin and is provided with mounting portions to be fixed to the upper side portion of the vehicle cabin, wherein the mounting portions are formed on a side of the casing by heat pressing.

By this configuration, mass production of such casings for the side airbag devices can be made.

A side airbag device for restraining an occupant's head according to another aspect of the present invention, which is installed to an upper side portion of a vehicle cabin, comprises a casing extending in the longitudinal direction and an airbag having a band-like configuration in the folded state which is accommodated in the casing. The airbag device further includes mounting portions to be fixed to the upper side portion of the vehicle cabin, which are formed at intervals of 500 mm or less.

By this configuration, the casing can be formed with mounting portions more than the conventional one, so that an impact force developed during the inflation and the deployment of the airbag can be dispersed to the respective mounting portions in a preferable manner, thereby achieving a stable deployment of the airbag.

A side airbag device for restraining an occupant's head according to still another aspect of the present invention, which is installed to an upper side portion of a vehicle cabin, comprises a casing extending in the longitudinal direction and an airbag having a band-like configuration in the folded state which is accommodated in the casing. The casing is made of an extruded resin and is provided with mounting portions to be fixed to the upper side portion of the vehicle cabin, wherein portions of an edge of the airbag are clamped by the mounting portions.

The aforementioned configuration can provide a simple structure for securing the airbag to the casing to thereby reduce the cost.

In the side impact airbag device of the present invention, the mounting portions are provided with holes, respectively, through It which the casing is secured to the vehicle body by means of screws, thereby facilitating the working for installing the side airbag device to the vehicle body.

BRIEF DESCRIPTION OF THE DRAWINGS

FIG. 1 is a general view of a side airbag device for restraining an occupant's head according to an embodiment of the present invention;

DETAILED DESCRIPTION OF A PREFERRED EMBODIMENT

Hereinafter, an embodiment of the present invention will be described with reference to the accompanying drawings. It is to be noted that the front of the vehicle is referred to as the front side and the rear of the vehicle is referred to as the rear side in this embodiment.

Figure 2A:
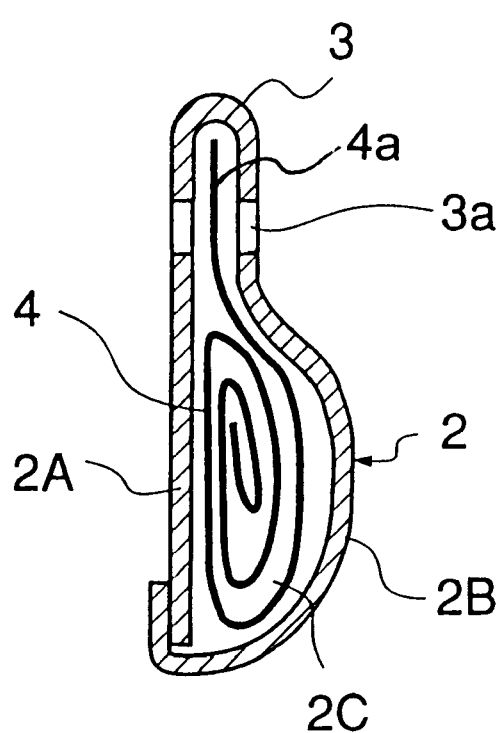
FIG. 2(a) is a sectional view taken along line 2(a)—2(a) in FIG. 1.
Figure 2B:
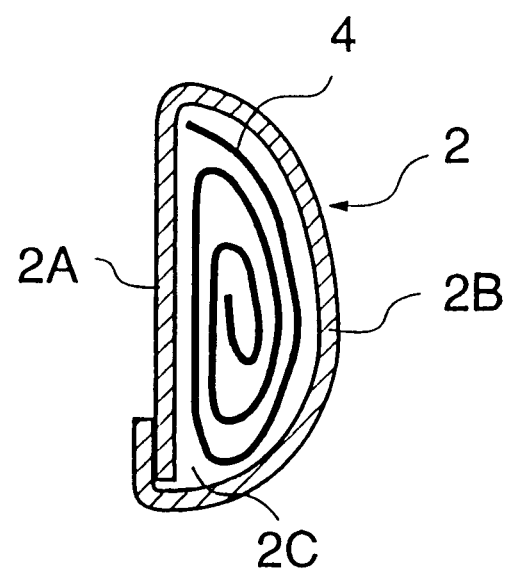
FIG. 2(b) is a sectional view taken along line 2(b)—2(b) in FIG. 1.
Figure 3:
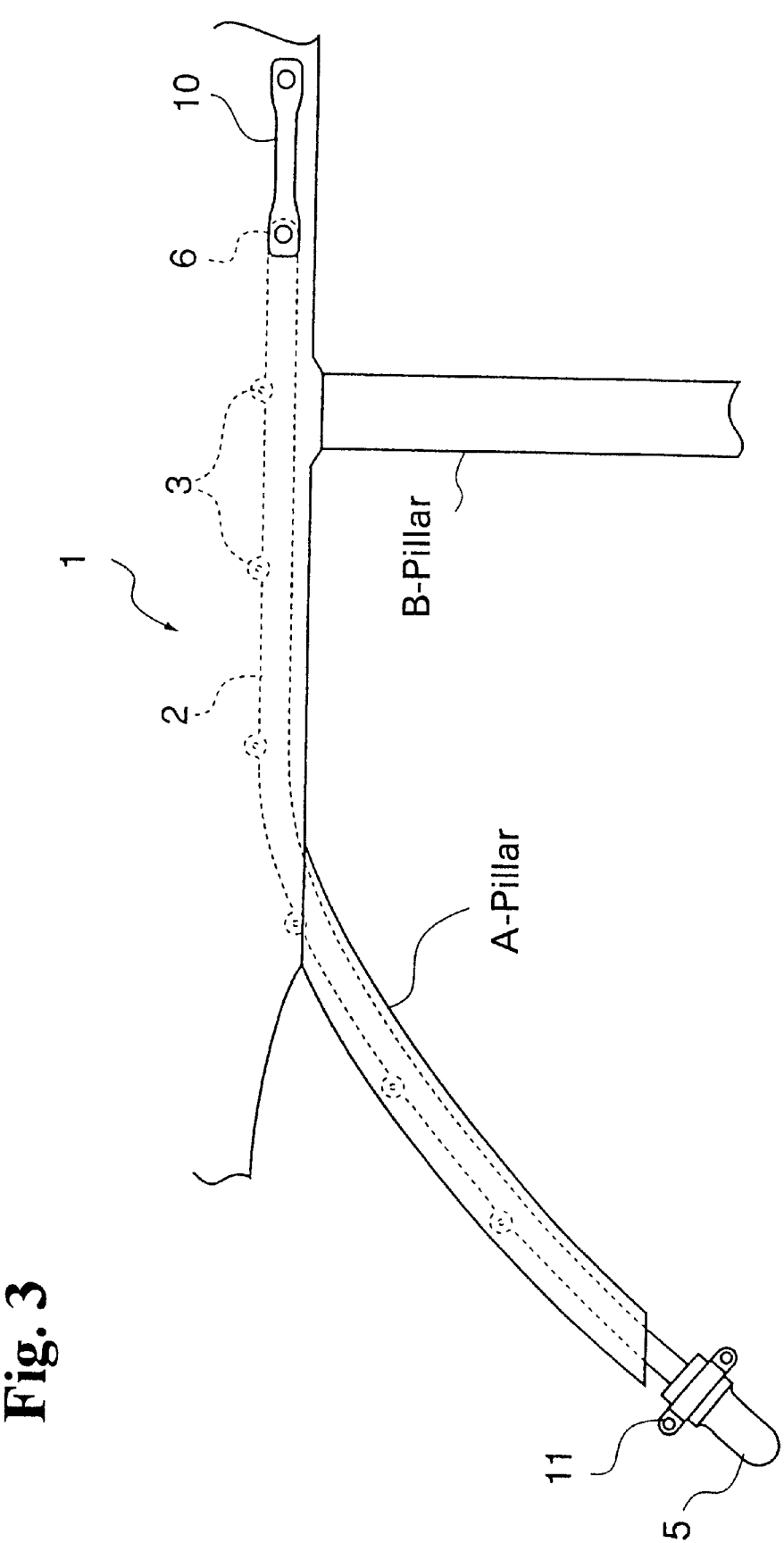
FIG. 3 is a view showing the side airbag device according to the embodiment of the present invention in the state where the airbag device is installed to a vehicle body.

FIG. 1 through FIG. 3 are views showing a side airbag device or side impact airbag device 1 according to one embodiment of the present invention. In these figures, FIG. 1 is a general view of the side airbag device 1. FIG. 2(a) is a sectional view taken along line 2(a)—2(a) in FIG. 1, and FIG. 2(b) is a sectional view taken along line 2(b)—2(b) in FIG. 1. FIG. 3 is a view showing the side airbag device 1 in the state that it is installed in a vehicle.

The side airbag device 1 comprises a casing 2 for accommodating an airbag inside thereof. The casing 2 is made of resin, such as soft polypropylene or thermoplastic elastomer, e.g. THERMORUN available from Mitsubishi Chemical Corporation, and is formed by extrusion molding. The casing 2 is formed in an elongated configuration, which extends from a front pillar (A-pillar) to a center pillar (B-pillar), and has a crescentic or semicircular cross section, as shown in FIGS. 2(a) and 2(b). The casing 2 comprises a flat portion 2A, a curved portion 2B having a crescent shape, and a receiving space 2C between the flat portion 2A and the curved portion 2B. The thickness of the casing 2 is in a range from 0.5 mm to 1.0 mm in this configuration.

The casing 2 includes six mounting portions 3 formed on one side edge, i.e. upper side edge in each figure. Each mounting portion 3 is provided with a hole 3a therein. The mounting portions 3 are formed by heat pressing at superposed portions of the flat portion 2A and the curved portion 2B about the bordering edge. The interval between the adjacent mounting portions 3 is 500 mm or less. On the other hand, the other side edge, i.e. lower side edge in the figure, of the casing 2 is formed so that it is allowed to be opened. That is, as shown in FIGS. 2(a) and 2(b), at the lower intersection between the flat portion 2A and the curved portion 2B, the edge of the curved portion 2B is bent upwards to lay on an outer surface of the lower edge of the flat portion 2A.

Accommodated in the receiving space 2C of the casing 2 is a long envelop-shape airbag 4 having a band-like configuration in the folded state. Projecting portions or edge portions 4a at one side edge, i.e. upper edge, of the airbag 4 are clamped inside the respective mounting portions 3, i.e. between the bordering edges of the flat portion 2A and the curved portion 2B, of the casing 2. Since the portions of the airbag 4 are clamped, the airbag 4 is secured to the casing 2.

Attached to one end in the longitudinal direction, i.e. front side of the vehicle or the left side end in FIG. 1 and FIG. 3, of the casing 2 is a gas generator 5 allowed to communicate with the inside of the airbag 4. The gas generator 5 supplies pressurized gas into the airbag 4 corresponding to a signal from a sensor (not shown) when the sensor detects a side impact during a vehicle collision, so as to inflate the airbag 4. Attached to the other end, i.e. rear side of the vehicle or the right side end in FIG. 1 and FIG. 3, is a fixture 6 which is fixed integrally with an assist grip 10 attached to the vehicle body as shown in FIG. 3. The fixture 6 is a flat metal plate with a hole formed in the center thereof, into which a bolt for fixing the assist grip 10 is inserted.

A description will now be made as regard to the operation of the side airbag device 1 structured as mentioned above.

The side airbag device 1 is packed in the state shown in FIG. 1 and is delivered in this state to a car manufacturer. To install the side airbag device 1 along the roof side from the front pillar to the center pillar of the vehicle body, as shown in FIG. 3, the fixture 6 disposed on the rear end of the casing 2 is fixed to the vehicle body integrally with the assist grip 10. Because normally, the assist grip 10 is previously fixed to the vehicle body, a bolt for fixing the assist grip 10 is once removed and is inserted again after the fixture 6 is arranged between the vehicle body and the assist grip 10, thus fixing the fixture 6 to the vehicle body integrally.

After the rear end of the casing 2 is fixed, the side airbag device 1 is disposed along the roof side, and screws are inserted into the holes 3a of the mounting portions 3 formed in the casing 2 to fix the casing 2 to the vehicle body. After the side airbag device 1 is installed, an ornamental roof garnish or an A-pillar garnish is attached onto the side airbag device 1. The gas generator 5 at the front end of the casing 2 is secured to the vehicle body by using a separate fixture 11.

When the vehicle is in the normal state, the side airbag device 1 installed as mentioned above is in the state where the airbag 4 is folded and accommodated in the casing 2, and the casing 2 is in the closed state where the edges of the flat portion 2A and the curved portion 2B are superposed on each other (see FIGS. 2(a) and 2(b)). As a side collision occurs to the vehicle in this state, the gas generator 5 supplies gas into the airbag 4. The airbag 4, which has been inflated and deployed with the supplied gas, opens the casing 2, i.e. releases the superposition between the flat portion 2A and the curved portion 2B, and is deployed into a predetermined configuration between the vehicle body and the occupant's head.

Because the interval between the adjacent mounting portions 3 of the casing 2 is 500 mm or less and the number of the portions 3 fixed to the vehicle body is increased, the impact force developed during the inflation and the deployment of the airbag can be dispersed to the respective mounting portions in a preferable manner. Therefore, the possibility of damaging the casing 2 according to the impact can be reduced as compared to the normal case.

According to the side airbag device 1, the casing 2 is made of an extruded resin, thereby facilitating the manufacturing and reducing its cost. Further, the device 1 is secured by using screws, thereby eliminating the necessity of working by skilled workers.

As described above, according to the present invention, the casing is made of an extruded resin, and the mounting portions are formed by heat pressing, thereby facilitating continuous mass production of the casings and also extremely reducing its cost. In case the interval between the adjacent mounting portions is set to be 500 mm or less, the number of the portions fixed to the vehicle body is increased, so that the impact force developed during inflation and deployment of the airbag can be dispersed. The portions of the edge of the airbag are clamped by the mounting portions of the casing, so that the working for assembling the airbag to the casing can be facilitated.

While the invention has been explained with reference to the specific embodiment of the invention, the explanation is illustrative and the invention is limited only by the appended claims.

What is claimed is:

1. A side airbag device for restraining an occupant's head to be installed at an upper side portion of a vehicle cabin, comprising:

an elongated casing extending in a longitudinal direction and being made of an extruded resin, said elongated casing including a flat portion, a curved portion integrally connected to the flat portion at an upper portion thereof to be disposed over the flat portion to have a space therebetween, and mounting portions to be fixed to the upper side portion of the vehicle cabin, said mounting portions being formed by heat pressing to have flat shapes and formed on a side of the casing to partially protrude upwardly from the flat portion and the curved portion to have a space therebetween, each of the mounting portions having a hole therein for allowing a screw to pass therethrough to fix the elongated casing to the upper side portion of the vehicle cabin, and an airbag having an elongated configuration to be folded and accommodated in the space between the flat portion and the curved portion of the casing, and projecting portions projecting outwardly from an upper edge thereof, each of said projecting portions being located in one of the spaces of the mounting portions to be clamped to the elongated casing at the mounting portions.

2. A side airbag device according to claim 1, wherein said mounting portions are formed at intervals of at most 500 mm.

3. A side airbag device according to claim 1, wherein said curved portion has a lower edge directly contacting the flat portion.

4. A side airbag device according to claim 3, further comprising a gas generator attached tq one longitudinal end of the airbag, and a fixture connected to the other longitudinal end of the airbag to fix the other longitudinal end to the vehicle.

* * * * *